(12) United States Patent
Panda et al.

(10) Patent No.: US 10,880,403 B2
(45) Date of Patent: Dec. 29, 2020

(54) AUTONOMOUS CONTEXT AWARE STATE EXCHANGING HIERARCHICAL COGNITIVE EDGE NETWORK

(71) Applicant: Tata Consultancy Services Limited, Mumbai (IN)

(72) Inventors: Satnik Panda, West Bengal (IN); Prateep Misra, West Bengal (IN); Soumitra Naskar, West Bengal (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/698,241

(22) Filed: Nov. 27, 2019

(65) Prior Publication Data

US 2020/0177703 A1    Jun. 4, 2020

(30) Foreign Application Priority Data

Nov. 29, 2018  (IN) .............................. 201821045109

(51) Int. Cl.
*H04L 29/08* (2006.01)
*H04L 12/24* (2006.01)
*H04L 29/06* (2006.01)

(52) U.S. Cl.
CPC ............ *H04L 67/327* (2013.01); *H04L 41/12* (2013.01); *H04L 63/065* (2013.01); *H04L 67/325* (2013.01); *H04L 67/34* (2013.01)

(58) Field of Classification Search
None
See application file for complete search history.

(56) References Cited

U.S. PATENT DOCUMENTS

| 6,721,907 B2 * | 4/2004 | Earl .................... G06F 11/0709 714/57 |
| 8,769,019 B2 | 7/2014 | Chalmers et al. |
| 10,397,303 B1 * | 8/2019 | Kuo .................... H04L 61/2038 |
| 2003/0088659 A1 | 5/2003 | Susarla et al. |
| 2013/0307702 A1 * | 11/2013 | Pal ...................... A47L 15/0047 340/870.02 |
| 2014/0344063 A1 * | 11/2014 | Vallat ................. G06Q 30/0267 705/14.64 |

(Continued)

FOREIGN PATENT DOCUMENTS

| EP | 2890054 A1 | 12/2013 |
| EP | 3076257 A1 | 3/2015 |

*Primary Examiner* — James A Edwards
(74) *Attorney, Agent, or Firm* — Finnegan, Henderson, Farabow, Garrett & Dunner LLP

(57) ABSTRACT

This disclosure relates to a distributed state exchanging model for assets of an organization or entity for an identified task in a domain of interest. The model provides a context aware autonomous Internet of things (IoT) based cognitive edge network, wherein each node is aware of the state of the other nodes based on a subscription. The state information is seamlessly updated and maintained by a certifying node of each group. The nodes are grouped based on associated capability definitions such that at least some of the groups form a hierarchy within the cognitive edge network for completing the identified task. Since the network is context aware, a new sub-task towards completing the identified task is autonomously selected by either groups or by the nodes based on the context thereby obviating a need for centralized scheduling.

11 Claims, 5 Drawing Sheets

(56) References Cited

U.S. PATENT DOCUMENTS

| | | | | |
|---|---|---|---|---|
| 2018/0302440 A1* | 10/2018 | Hu | ........................... | H04L 63/20 |
| 2019/0296967 A1* | 9/2019 | Yang | ................... | H04L 41/0816 |
| 2019/0349190 A1* | 11/2019 | Smith | ..................... | H04L 69/18 |
| 2019/0349426 A1* | 11/2019 | Smith | .................... | H04L 67/104 |
| 2020/0134205 A1* | 4/2020 | Hsiao | .................... | H04L 9/3242 |

\* cited by examiner

AUTONOMOUS CONTEXT AWARE STATE EXCHANGING HIERARCHICAL COGNITIVE EDGE NETWORK

PRIORITY CLAIM

This U.S. patent application claims priority under 35 U.S.C. § 119 to: Indian Patent Application No. 201821045109, filed on 29 Nov. 2018. The entire contents of the aforementioned application are incorporated herein by reference.

TECHNICAL FIELD

The disclosure herein generally relates to distributed state management systems, and, more particularly, to systems and computer implemented methods for creating an autonomous context aware state exchanging hierarchical cognitive edge network.

BACKGROUND

In today's age of connected devices and sophisticated protocols for device communication, one of the fields of significant importance and growth is Industrial Internet-of-Things (IoT). Industrial IoT, in an industry or plant context, refers to a huge network of devices ranging from programmable logic controller (PLC) based devices in machine components to level control and monitoring systems. In such a diverse scenario, an edge network, as a middleware between the devices and cloud is not sufficient. Complete automation of IoT enabled machines for operating autonomously is a challenge.

SUMMARY

Embodiments of the present disclosure present technological improvements as solutions to one or more of the above-mentioned technical problems recognized by the inventors in conventional systems.

In an aspect, there is provided a processor implemented method for creating an autonomous context aware state exchanging cognitive edge network in an ecosystem, the method comprising the steps of: receiving periodically or when triggered by a change in the ecosystem, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets, rules defining safe operating limits for operation of each asset from the plurality of assets, and lifecycle process definition of each asset from the plurality of assets, wherein at least some of the plurality of IoT nodes are identified as certifying nodes and remaining are identified as asset nodes, wherein the certifying nodes are configured to validate and certify the asset nodes; modeling a plurality of asset shadows based on the received state information, each asset shadow being associated with a corresponding asset from the plurality of assets and the associated processes; forming a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network, the full trust group comprises at least one asset node having a unique identity in the cognitive edge network, a subordinate Certifying Authority (CA) certificate and a key pair comprising a public key and a private key, and a certifying node having a unique identity in the cognitive edge network and a root CA certificate for validating the least one asset node in the group; and the hybrid trust group comprises at least one full trust group having a certifying node and one or more independent asset nodes; updating, in response to the received state information, a state machine corresponding to each of the plurality of assets; publishing, by each of the plurality of IoT nodes, the updated state information pertaining to the updated state machine associated thereof, to one or more of the plurality of IoT nodes of the one or more groups based on a subscription for a context by each of the plurality of IoT nodes, wherein the context comprises the published updated state information of the plurality of assets and the associated processes across the hierarchy and the identified task in accordance with the pre-defined ontology; and autonomously selecting, a new sub-task towards completing the identified task, upon completion of the identified sub-task by either the one or more groups or by one or more of the plurality of IoT nodes based on the context.

In another aspect, there is provided a system for creating an autonomous context aware state exchanging cognitive edge network in an ecosystem, the system comprising: one or more data storage devices operatively coupled to one or more hardware processors and configured to store instructions configured for execution by the one or more hardware processors to: receive periodically or when triggered by a change in the ecosystem, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets; rules defining safe operating limits for operation of each asset from the plurality of assets; and lifecycle process definition of each asset from the plurality of assets, wherein at least some of the plurality of IoT nodes are identified as certifying nodes and remaining are identified as asset nodes, wherein the certifying nodes are configured to validate and certify the asset nodes; model a plurality of asset shadows based on the received state information, each asset shadow being associated with a corresponding asset from the plurality of assets and the associated processes; form a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network; the full trust group comprises at least one asset node having a unique identity in the cognitive edge network, a subordinate CA certificate and a key pair comprising a public key and a private key, and a certifying node having a unique identity in the cognitive edge network and a root CA certificate for validating the least one asset node in the group; and the hybrid trust group comprises at least one full trust group having a certifying node and one or more independent asset nodes; and update, in response to the received state information, a state machine corresponding to each of the plurality of assets; wherein each of the plurality of IoT nodes publish the updated state information pertaining to the updated state machine associated thereof, to one or more of the plurality of IoT nodes of the one or more groups based on a subscription for a context by each of the plurality of IoT nodes, the context comprising the published updated state information of the plurality of assets and the associated processes across the hierarchy and the identified task in accordance with the pre-defined ontology; and wherein a new sub-task towards completing the identified task is autonomously selected, upon completion of the identified sub-task by either the one or more groups or by one or more of the plurality of IoT nodes based on the context.

In yet another aspect, there is provided a computer program product comprising a non-transitory computer readable medium having a computer readable program embodied therein, wherein the computer readable program, when executed on a computing device, causes the computing device to: receive periodically or when triggered by a change in the ecosystem, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets; rules defining safe operating limits for operation of each asset from the plurality of assets; and lifecycle process definition of each asset from the plurality of assets, wherein at least some of the plurality of IoT nodes are identified as certifying nodes and remaining are identified as asset nodes, wherein the certifying nodes are configured to validate and certify the asset nodes; model a plurality of asset shadows based on the received state information, each asset shadow being associated with a corresponding asset from the plurality of assets and the associated processes; form a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network; the full trust group comprises at least one asset node having a unique identity in the cognitive edge network, a subordinate CA certificate and a key pair comprising a public key and a private key, and a certifying node having a unique identity in the cognitive edge network and a root CA certificate for validating the least one asset node in the group; and the hybrid trust group comprises at least one full trust group having a certifying node and one or more independent asset nodes; and update, in response to the received state information, a state machine corresponding to each of the plurality of assets; wherein each of the plurality of IoT nodes publish the updated state information pertaining to the updated state machine associated thereof, to one or more of the plurality of IoT nodes of the one or more groups based on a subscription for a context by each of the plurality of IoT nodes, the context comprising the published updated state information of the plurality of assets and the associated processes across the hierarchy and the identified task in accordance with the pre-defined ontology; and wherein a new sub-task towards completing the identified task is autonomously selected, upon completion of the identified sub-task by either the one or more groups or by one or more of the plurality of IoT nodes based on the context.

In accordance with an embodiment of the present disclosure, wherein at least some of the asset nodes form part of the one or more groups of the plurality of IoT nodes based on the received information, and wherein the asset nodes forming part of more than one group maintain a discrete subordinate CA certificate and a discrete key pair for each group the asset nodes belongs but maintains the same unique identity in the cognitive edge network.

In accordance with an embodiment of the present disclosure, wherein the certifying node of a group joins another group from the one or more groups at any point in time as the asset node.

In accordance with an embodiment of the present disclosure, wherein the asset node forms part of the one or more groups of the plurality of IoT nodes by using either the unique identity associated thereof or the unique identity along with the public key and private key associated thereof.

In accordance with an embodiment of the present disclosure, wherein the asset node joins or leaves the one or more groups of the plurality of IoT nodes by broadcasting to one or more of the plurality of IoT nodes.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In an ecosystem like a factory, there are typically multiple machines with multiple capabilities and a set of jobs to be executed. In an exemplary factory, say a product having multiple components/sub-components is being manufactured. Each component/sub-component may be manufactured by a discrete machine. So if even one of the machines fail, the entire product manufacturing schedule is affected and thereby the productivity of the factory. It is imperative that in such cases, the machines are assigned tasks based on the capability of each machine and that of the other machines and their engagements to ensure seamless transfer of tasks. This needs human intervention and knowledge of the ontology of devices and the ecosystem it operates in, along with real time states and capabilities of each machine in the ecosystem. The present disclosure addresses this technical challenge as described hereinafter.

Figure 1:
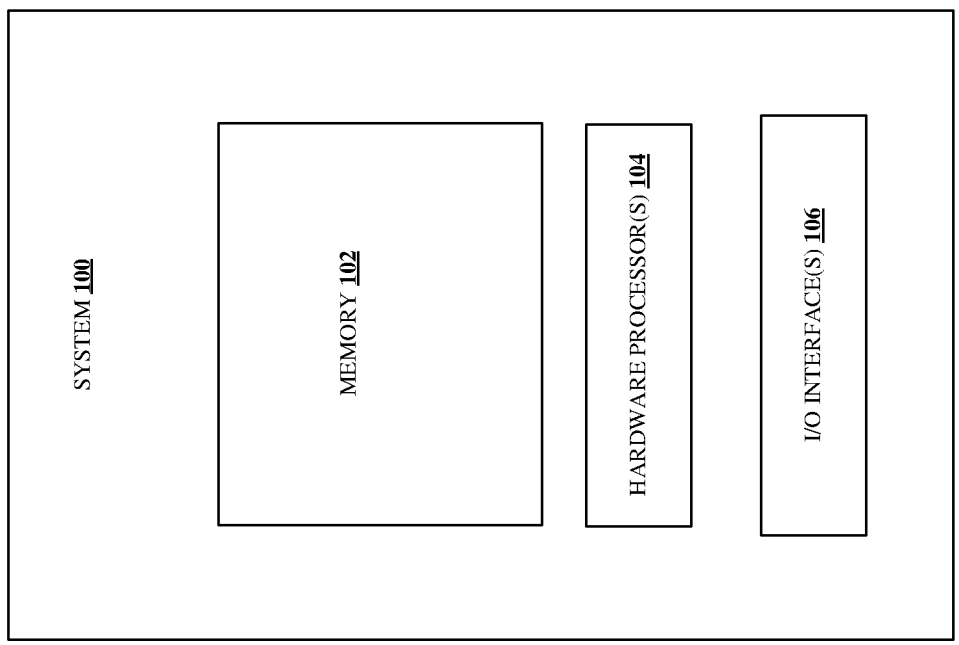
FIG. 1 illustrates an exemplary block diagram of a system for creating an autonomous context aware state exchanging hierarchical cognitive edge network, in accordance with an embodiment of the present disclosure.
Figure 2A:
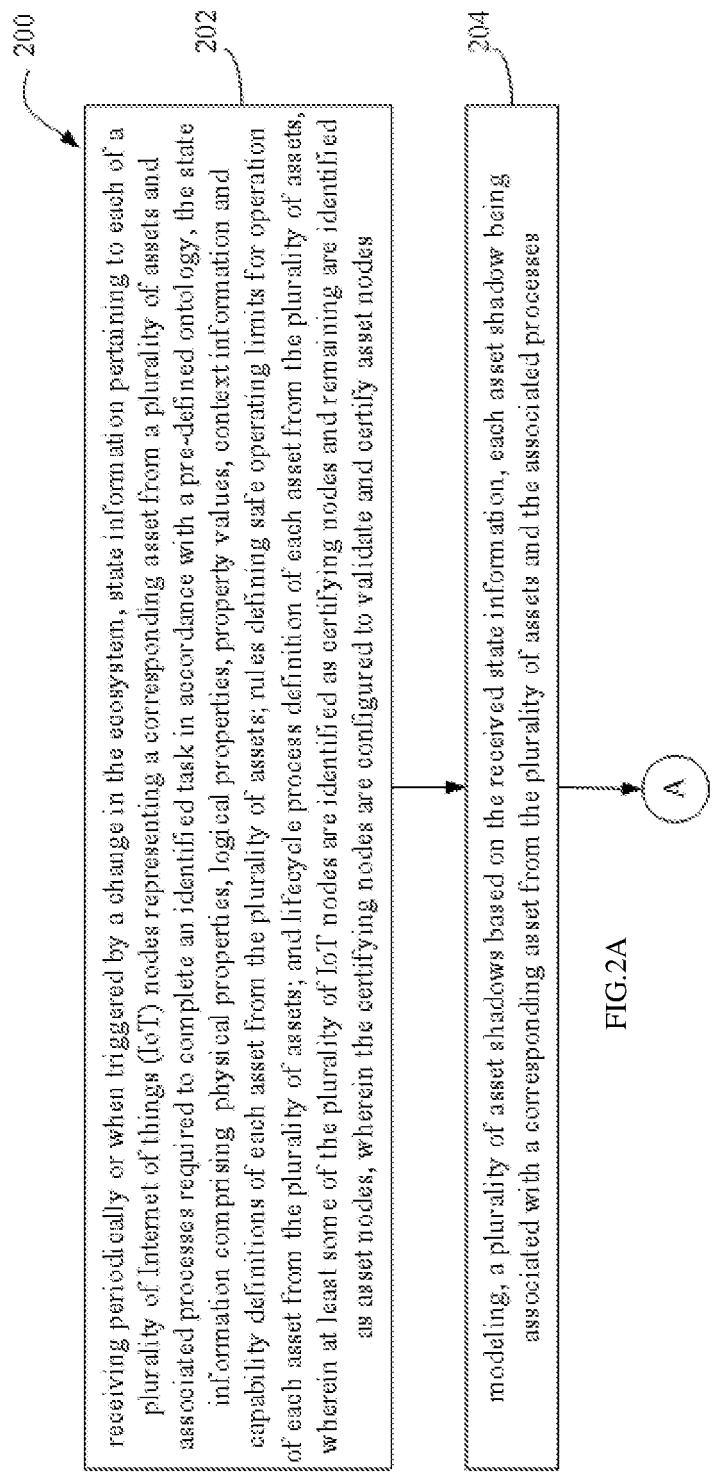
FIG. 2A through FIG. 2C illustrates an exemplary flow diagram of a computer implemented method for creating an autonomous context aware state exchanging hierarchical cognitive edge network, in accordance with an embodiment of the present disclosure.
Figure 2B:
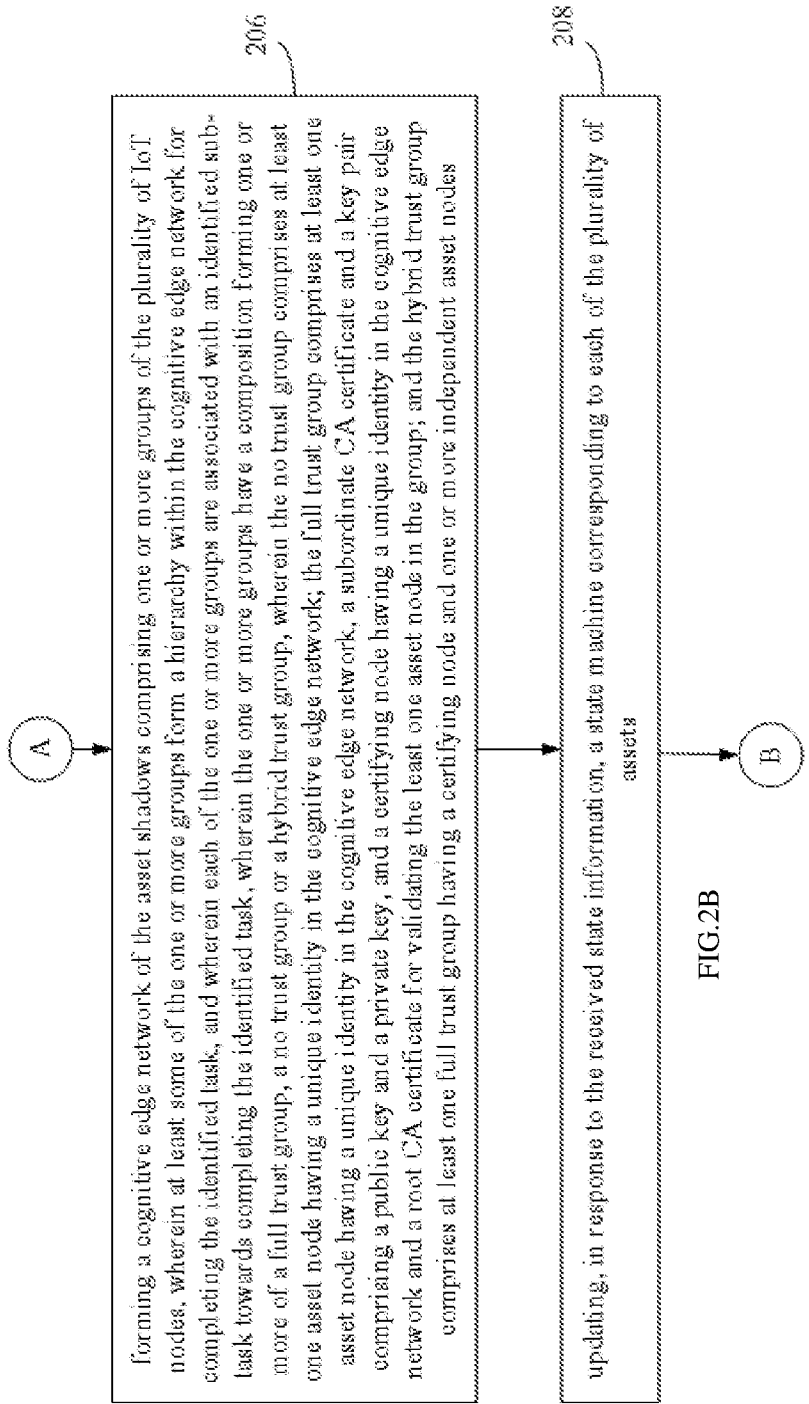
Figure 2C:
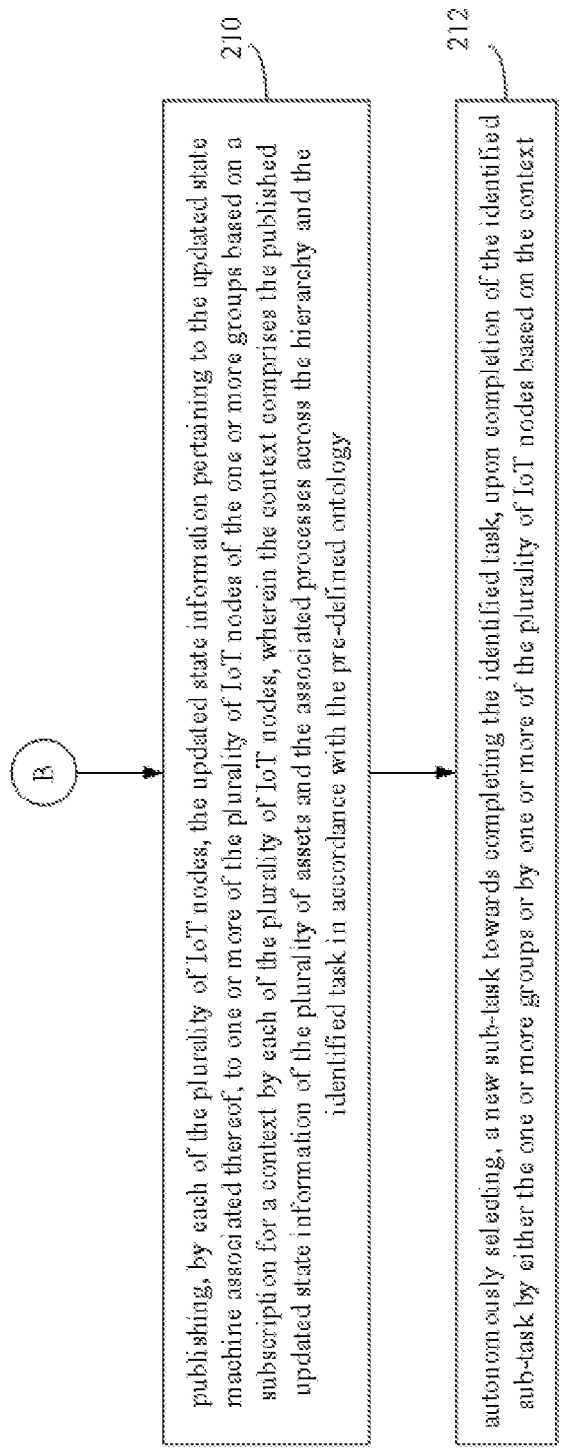
Figure 3:
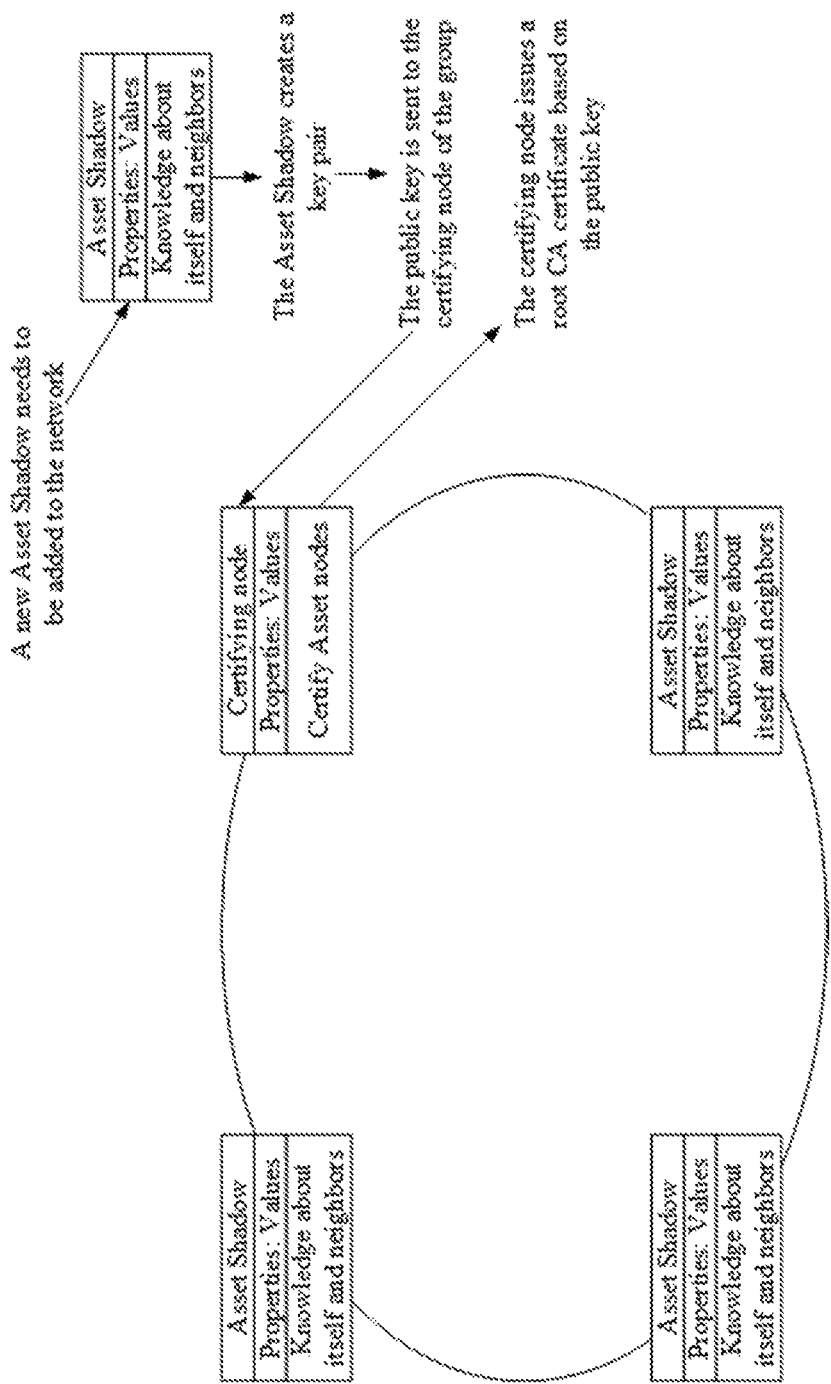
FIG. 3 illustrates registration of a new asset shadow into a full trust group, in accordance with an embodiment of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

FIG. 1 illustrates an exemplary block diagram of a system 100 for creating an autonomous context aware state exchanging hierarchical cognitive edge network in an ecosystem, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2A through FIG. 2C illustrates an exemplary flow diagram for a computer implemented method 200 for creating an autonomous context aware state exchanging hierarchical cognitive edge network in an ecosystem, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, the one or more processors 104 are configured to receive either periodically or when triggered by a change in the ecosystem, at step 202, state information pertaining to each of a plurality of Internet of things (IoT) nodes representing a corresponding asset from a plurality of assets and associated processes required to complete an identified task in accordance with a pre-defined ontology. In the context of the present disclosure, the pre-defined ontology may be custom defined for a particular domain. Relationships between the plurality of assets and associated processes for each domain defines an ontology. Again, in the context of the present disclosure, the state information comprises not only the physical properties of each asset from the plurality of assets, but also the logical properties, values associated with these properties, context information and capability definitions of each asset from the plurality of assets, rules defining safe operating limits for operation of each asset and lifecycle process definition of each asset. In an embodiment, the logical properties may include process properties, threshold values to meet some rules, parameters of order, values from other sub systems, and the like. The state information received forms an information model for each of the plurality of assets. The model is a local copy of the properties and values of a corresponding asset. The modeling may be done in both online and offline mode. The online mode requires connectivity to the internet. The offline mode enables importing a local structure of the asset and storing the same in local. Values associated with some of the state information may be more dynamically changing unlike information associated with some like the capability definitions or the rules. Again, lifecycle process is typically stable for a given task. The state of an asset determines evaluation of the rules. For instance, if rotation speed of a spindle load is 300 rotations per minute (rpm) and an associated rule states the rotation speed needs to be limited to 250 rpm, then the state of the associated asset may be 'dangerous'.

In accordance with an embodiment of the present disclosure, at least some of the plurality of IoT nodes are identified as certifying nodes and remaining are identified as asset nodes, wherein the certifying nodes are configured to validate and certify the asset nodes. The information model gets initialized during the validation process. Each of the plurality of IoT nodes has its own state and completion of the identified task depends on the cumulative state of the ecosystem.

In accordance with an embodiment of the present disclosure, the one or more processors 104 are configured to model, at step 204, a plurality of asset shadows based on the received state information, each asset shadow being associated with a corresponding asset from the plurality of assets and the associated processes. For easy access to current state of each of the asset nodes, a snapshot of the corresponding information model is stored in memory persistent storage.

In accordance with an embodiment of the present disclosure, the one or more processors 104 are configured to form, at step 206, a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task.

In accordance with the present disclosure, the formed one or more groups may have a composition forming one or more of a full trust group, a no trust group or a hybrid trust group, wherein the no trust group comprises at least one asset node having a unique identity in the cognitive edge network; the full trust group comprises at least one asset node having a unique identity in the cognitive edge network, a subordinate Certifying Authority (CA) certificate and a key pair comprising a public key and a private key, and a certifying node having a unique identity in the cognitive edge network and a root CA certificate for validating the at least one asset node in the group; and the hybrid trust group comprises at least one full trust group having a certifying node and one or more independent asset nodes.

In accordance with an embodiment of the present disclosure, an asset node may form part of one or more groups of the plurality of IoT nodes based on the received information. Joining or leaving a group may be necessitated by functional failure or intentional shutdown of one or more asset nodes based on process requirements. In accordance with the present disclosure, when an asset forms part of more than one group, it maintains a discrete subordinate CA certificate and a discrete key pair for each group it belongs to, but maintains the same unique identify in the cognitive edge network. Again, the certifying node of a group may join another group at any point in time as the asset node.

In accordance with the present disclosure, the asset node forms part of the one or more groups of the plurality of IoT nodes by using either the unique identify, in case of no trust group or the unique identify along with the public key and the private key, in case of joining a full trust group having a certifying node.

FIG. 3 illustrates registration of a new asset shadow into a full trust group, in accordance with an embodiment of the present disclosure. When a new asset shadow needs to join a group, the new asset shadow generates the key pair comprising the public key and the private key. The public key of the new asset shadow is sent to the certifying node of the group that the new asset shadow needs to join. The certifying node validates the new asset shadow and issues the subordinate CA certificate based on the public key.

In an embodiment, when the new asset shadow needs to join a no trust group, only the unique identifier is used and the new asset shadow joins the group without any formal validation. Such a scenario occurs in the case of machines (asset) having no engagement with any other machine and is hence capable of operating independently as part of a no trust group.

In an embodiment, when an asset shadow needs to leave a full trust group, it informs the certifying node by sending a request for de-registration using its public key. The certifying node validates the subordinate CA certificate and upon validation, revokes the subordinate certificate assigned to the asset shadow. The certifying node then broadcasts the information to all the asset nodes in each of the one or more groups of the plurality of IoT nodes and requests all other certified asset shadows to revoke the leaving asset node's subordinate CA certificate, post which the asset shadow leaves the full trust group. Alternatively, the asset shadow that needs to leave a full trust group broadcasts the information to all the nodes in the group and leaves. The certifying node of the group then relays the information to all the groups it is connected with. When an asset shadow needs to leave a no trust group, it broadcasts the information to the other asset nodes in the group and leaves.

In accordance with the present disclosure, the asset node joins or leaves the one or more groups of the plurality of IoT nodes by broadcasting to one or more of the plurality of IoT nodes.

In accordance with an embodiment of the present disclosure, the one or more processors 104 are configured to update, in response to the received state information, at step 208, a state machine corresponding to each of the plurality of assets. In accordance with the present disclosure, the received state information includes updates received as part of the broadcasts when the asset node joins or leaves the one or more groups of the plurality of IoT nodes. In an embodiment, each time an update happens, a set point gets defined for the corresponding asset before a state change is triggered. A secure hashed log of each change associated with the asset shadow is maintained to facilitate life cycle simulation of the asset shadow, if needed, which guarantees integrity of the system and its distributed state by making the system tamper proof.

In accordance with an embodiment of the present disclosure, at step 210, each of the plurality of IoT nodes are configured to publish, the updated state information pertaining to the associated updated state machine, to one or more of the plurality of IoT nodes of the one or more groups based on a subscription for a context by each of the plurality of IoT nodes. In accordance with the present disclosure, the context comprises the published updated state information of the plurality of assets and the associated processes across the hierarchy and the identified task in accordance with the pre-defined ontology. For instance, if an asset node A of group A needs the state information from an asset node B of group B, the asset node A may have to raise a request for a subscription of the state information to the certifying node of group B to ensure that any change in the state information of the asset node B is published to the asset node A via the certifying node of the group A. Thus, publishing of the state information is configurable and controlled across the hierarchy for a given task and a given set of assets from the plurality of assets.

In accordance with an embodiment of the present disclosure, at step 212, a new sub-task towards completing the identified task may be autonomously selected by either the one or more groups or by one or more of the plurality of IoT nodes based on the context. Since the state information is published across the plurality of IoT nodes, the context aware nodes or the groups may pick up and execute a task based on associated capability of the nodes or the groups picking up the task and also the state of the entire ecosystem to complete the identified task. In accordance with the present disclosure, the system 100 is thus autonomous and obviates any need for centralized scheduling.

Thus systems and methods of the present disclosure provides a framework that sustains a digital twin of the physical assets along with the real-time state that includes the capabilities associated with the assets. It also provides extensibility for the business context and logic to facilitate autonomic decision making capabilities. The generic framework of the present disclosure may be used for any domain specific application with support for multiple communication protocols and extensions for business logic, as required, thus implementing autonomic asset digitization. The cognitive edge network is configured to be context aware with each node having a local copy of its current state and states of its neighbors. Any change in the ecosystem (self or neighbor) is communicated to all the nodes and the local copy is refreshed. In an embodiment, the protocol for communication may be either peer-to-peer (P2P) based real-time publish subscribe (RTPS) or Message Queuing Telemetry Transport (MQTT) bus to which all the state information updates happen in real time. Each asset node is integrated with a message bus which acts as a reservoir of all the state changes and actions performed by on any asset. As a result of the distributed state, the ecosystem state is reflected like a system of asset shadows trying to maintain the context automatically in real time and managed in such a manner that the system operates autonomously as per the pre-defined ontology.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for creating an autonomous context aware state exchanging cognitive edge network in an ecosystem (200), the method comprising the steps of:

receiving periodically or when triggered by a change in the ecosystem, by one or more hardware processors, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets, rules defining safe operating limits for operation of each asset from the plurality of assets, and lifecycle process definition of each asset from the plurality of assets, wherein at least some of the plurality of IoT nodes are identified as certifying nodes and nodes remaining are identified as asset nodes, wherein the certifying nodes are configured to validate and certify the asset nodes;

modeling, by the one or more hardware processors, a plurality of asset shadows based on the received state information, each asset shadow being associated with a corresponding asset from the plurality of assets and the associated processes;

forming, by the one or more hardware processors, a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network, the full trust group comprises at least one asset node having a unique identity in the cognitive edge network, a subordinate Certifying Authority (CA) certificate and a key pair comprising a public key and a private key, and a certifying node having a unique identity in the cognitive edge network and a root CA certificate for validating the least one asset node in the group, and the hybrid trust group comprises at least one full trust group having a certifying node and one or more independent asset nodes;

updating, in response to the received state information, by the one or more hardware processors, a state machine corresponding to each of the plurality of assets;

publishing, by each of the plurality of IoT nodes, the updated state information pertaining to the updated state machine associated thereof, to one or more of the plurality of IoT nodes of the one or more groups based on a subscription for a context by each of the plurality of IoT nodes, wherein the context comprises the published updated state information of the plurality of assets and the associated processes across the hierarchy and the identified task in accordance with the pre-defined ontology; and autonomously selecting, a new sub-task towards completing the identified task, upon completion of the identified sub-task by either the one or more groups or by one or more of the plurality of IoT nodes based on the context.

2. The processor implemented method of claim 1, wherein at least some of the asset nodes form part of the one or more groups of the plurality of IoT nodes based on the received information, and wherein the asset nodes forming part of more than one group maintain a discrete subordinate CA certificate and a discrete key pair for each group the asset nodes belongs but maintains the same unique identity in the cognitive edge network.

3. The processor implemented method of claim 1, wherein the certifying node of a group joins another group from the one or more groups at any point in time as the asset node.

4. The processor implemented method of claim 2, wherein the asset node forms part of the one or more groups of the plurality of IoT nodes by using either the unique identity associated thereof or the unique identity along with the public key and private key associated thereof.

5. The processor implemented method of claim 2, wherein the asset node joins or leaves the one or more groups of the plurality of IoT nodes by broadcasting to one or more of the plurality of IoT nodes.

6. A system for creating an autonomous context aware state exchanging cognitive edge network in an ecosystem, the system comprising: one or more data storage devices operatively coupled to one or more hardware processors and configured to store instructions configured for execution by the one or more hardware processors to:

receive periodically or when triggered by a change in the ecosystem, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets, rules defining safe operating limits for operation of each asset from the plurality of assets, and lifecycle process definition of each asset from the plurality of assets, wherein at least some of the plurality of IoT nodes are identified as certifying nodes and nodes remaining are identified as asset nodes, wherein the certifying nodes are configured to validate and certify the asset nodes;

model a plurality of asset shadows based on the received state information, each asset shadow being associated with a corresponding asset from the plurality of assets and the associated processes;

form a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network, the full trust group comprises at least one asset node having a unique identity in the cognitive edge network, a subordinate Certifying Authority (CA) certificate and a key pair comprising a public key and a private key, and a certifying node having a unique identity in the cognitive edge network and a root CA certificate for validating the least one asset node in the group; and the hybrid trust group comprises at least one full trust group having a certifying node and one or more independent asset nodes; and update, in response to the received state information, a state machine corresponding to each of the plurality of assets; wherein each of the plurality of IoT nodes publish the updated state information pertaining to the updated state machine associated thereof, to one or more of the plurality of IoT nodes of the one or more groups based on a subscription for a context by each of the plurality of IoT nodes, the context comprising the published updated state information of the plurality of assets and the associated processes across the hierarchy and the identified task in accordance with the pre-defined ontology; and wherein a new sub-task towards completing the identified task is autonomously selected, upon completion of the identified sub-task by either the one or more groups or by one or more of the plurality of IoT nodes based on the context.

7. The system of claim 6, wherein at least some of the asset nodes form part of the one or more groups of the plurality of IoT nodes based on the received information, and wherein the asset nodes forming part of more than one group maintain a discrete subordinate CA certificate and a discrete key pair for each group the asset nodes belongs but maintains the same unique identity in the cognitive edge network.

8. The system of claim 6, wherein the certifying node of a group joins another group from the one or more groups at any point in time as the asset node.

9. The system of claim 7, wherein the asset node forms part of the one or more groups of the plurality of IoT nodes by using either the unique identity associated thereof or the unique identity along with the public key and private key associated thereof.

10. The system of claim 7, wherein the asset node joins or leaves the one or more groups of the plurality of IoT nodes by broadcasting to one or more of the plurality of IoT nodes.

11. A computer program product comprising a non-transitory computer readable medium having a computer readable program embodied therein, wherein the computer readable program, when executed on a computing device, causes the computing device to:

receive periodically or when triggered by a change in the ecosystem, state information pertaining to each of a plurality of Internet of things (IoT) nodes representing a corresponding asset from a plurality of assets and associated processes required to complete an identified task in accordance with a pre-defined ontology, the state information comprising physical properties, logical properties, property values, context information and capability definitions of each asset from the plurality of assets, rules defining safe operating limits for operation of each asset from the plurality of assets, and lifecycle process definition of each asset from the plurality of assets, wherein at least some of the plurality of IoT nodes are identified as certifying nodes and nodes remaining are identified as asset nodes, wherein the certifying nodes are configured to validate and certify the asset nodes;

model a plurality of asset shadows based on the received state information, each asset shadow being associated with a corresponding asset from the plurality of assets and the associated processes;

form a cognitive edge network of the asset shadows comprising one or more groups of the plurality of IoT nodes, wherein at least some of the one or more groups form a hierarchy within the cognitive edge network for completing the identified task, and wherein each of the one or more groups are associated with an identified sub-task towards completing the identified task, wherein the one or more groups have a composition forming one or more of a full trust group, a no trust group or a hybrid trust group, wherein the no trust group comprises at least one asset node having a unique identity in the cognitive edge network, the full trust group comprises at least one asset node having a unique identity in the cognitive edge network, a subordinate Certifying Authority (CA) certificate and a key pair comprising a public key and a private key, and a certifying node having a unique identity in the cognitive edge network and a root CA certificate for validating the least one asset node in the group; and the hybrid trust group comprises at least one full trust group having a certifying node and one or more independent asset nodes; and update, in response to the received state information, a state machine corresponding to each of the plurality of assets;

wherein each of the plurality of IoT nodes publish the updated state information pertaining to the updated state machine associated thereof, to one or more of the plurality of IoT nodes of the one or more groups based on a subscription for a context by each of the plurality of IoT nodes, the context comprising the published updated state information of the plurality of assets and the associated processes across the hierarchy and the identified task in accordance with the pre-defined ontology; and wherein a new sub-task towards completing the identified task is autonomously selected, upon completion of the identified sub-task by either the one or more groups or by one or more of the plurality of IoT nodes based on the context.

\* \* \* \* \*